United States Patent Office 3,828,062
Patented Aug. 6, 1974

3,828,062
PROCESS FOR THE PREPARATION OF
DES A-9β-STEROIDS
Andor Furst, Basel, Ludwig Labler, Allschwil, Werner Meier, Bottmingen, and Peter Muller, John William Scott, and Erich Widmer, Arlesheim, Switzerland, assignors to Hoffmann-La Roche Inc., Nutley, N.J.
No Drawing. Filed Apr. 14, 1971, Ser. No. 134,091
Claims priority, application Switzerland, May 21, 1970, 7,498/70
Int. Cl. C07d 85/00
U.S. Cl. 260—307 H                       17 Claims

ABSTRACT OF THE DISCLOSURE

DesA-9β-steroids are produced by the hydrogenation of desA-Δ⁹-steroids using a palladium catalyst in the presence of hydrobromic acid. These compounds are useful intermediates for the preparation of hormonally active 9β,10α-steroids.

DETAILED DESCRIPTION OF THE INVENTION

The present invention concerns a process for the production of desA-9β-steroids, particularly those of the formula

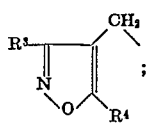

I where $R^1$ is lower alkyl; $R^2$ is hydrogen, lower alkyl, 3-oxobutyl, ketalized 3-oxo-butyl, 3-chlorobut-2-enyl, 2-alkoxycarbonyl-ethyl, 2-carboxyethyl, 2-cyanoethyl or isoxazolyl-methyl of the formula

$R^3$ and $R^4$ are the same lower alkyl or one of the groups is hydrogen and the other lower alkyl; D is a group of one of the formulas

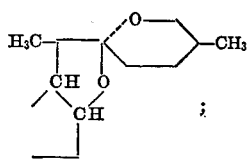

or

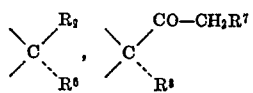

Z is carbonyl or one of the groups

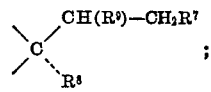

or

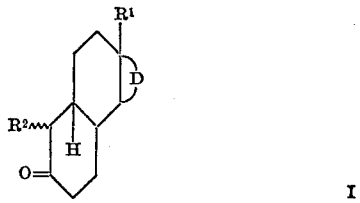

where $R^5$ is hydroxy, or etherified or esterified hydroxy; $R^6$ is hydrogen or lower alkyl; $R^7$ is hydrogen or hydroxy;

$R^8$ is hydrogen, hydroxy or lower alkyl and $R^9$ is hydroxy or esterified hydroxy.

As used throughout the specification and the appended claims, the term "lower," in conjunction with a hydrocarbon group such as alkyl, alkenyl or alkynyl, means a group containing up to eight carbon atoms. Examples of lower alkyl groups are methyl, ethyl, propyl, isopropyl, butyl, tert.-butyl, hexyl, 2-ethyl hexyl, and so forth; examples of lower alkenyl groups are vinyl, allyl, methallyl, hexenyl and so forth; examples of lower alkynyl groups are ethynyl, propynyl, hexynyl and so forth. Examples of etherified hydroxy groups are lower alkoxy, for example, methoxy, ethoxy, or tert.-butoxy; tetrahydropyranyloxy; or phenyl lower alkoxy such as benzyloxy. Examples of esterified hydroxy groups are the acyloxy residues of aliphatic or aromatic carboxylic acids, such as acetoxy, propionyloxy, stearoyloxy and benzoyloxy. Examples of ketals, with reference to the term "ketalized 3-oxobutyl group," are di(lower alkyl)ketals such as dimethyl or diethyl ketals; lower alkylene ketals such as ethylene or 2,3-butylene ketals; and arylene ketals such as an o-phenylene ketal.

In the formulas presented herein, the various substituents on cyclic compounds are joined to the cyclic nucleus by one of three notations, a solid line (—) indicating a substituent which is in the β-orientation (i.e., above the plane of the paper), a dotted line (----) indicating a substituent which is in the α-orientation (i.e., below the plane of the paper) or a wavy line (∼∼) indicating a substituent which is in either the α- or β-orientation. Although the position of the angular methyl group at carbon atom 13 of the steroid nucleus has been arbitrarily indicated as the β-orientation, i.e., the "natural" steroid series, the present invention is not to be construed as limited to the "natural" steroid series and is meant to include the corresponding "unnatural" and racemic steroid series.

The reaction products of this invention can be prepared in the form of racemates or optically active compounds, depending upon whether the starting materials employed for the synthetic process are racemates or optical antipodes.

The process according to the present invention is characterized by the hydrogenation of a desA-Δ⁹-steroid of the formula

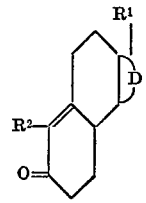

II where $R^1$, $R^2$ and D are as above, in an organic solvent with a palladium catalyst in the presence of hydrogen bromide.

Suitable organic solvents for the hydrogenation reaction are aliphatic and aromatic hydrocarbons such as pentane, hexane, cyclohexane, benzene, toluene and so forth; halogenated hydrocarbons such as dichloromethane or chloroform; alcohols such as methanol, ethanol, propanol, tert.-butanol and so forth; ethers such as diethyl ether, dioxane, tertrahydrofuran, and so forth; and esters such as ethyl acetate. Preferred solvents for this reaction are alcohols. Ethanol is especially preferred.

The hydrogenation catalyst used for the practice of the present invention is palladium. The palladium metal is preferably deposited on one of the usual supports. Examples of such supports are barium sulfate, strontium sulfate, asbestos, silica gel, calcium carbonate, and alumina.

A barium sulfate support is especially preferred. The quantity of palladium catalyst used in the present reaction is generally chosen so that the molar ratio of palladium metal to substrate is in the range of .05 to 20%. A ratio of about 5% is especially preferred. The weight ratio of palladium to carrier material is kept in the range of between 0.1 and 20%. An especially preferable range is 5 to 10%.

The quantity of hydrogen bromide necessary for the present reaction is not narrowly critical and can vary over a wide range, depending upon the substrate utilized in any particular embodiment of the present invention. It is generally preferred to use between 0.003 and 10 equivalents of hydrogen bromide with reference to the substrate to be hydrogenated. The optimum quantity can easily be determined by preliminary experiments. In a preferred embodiment of the present invention, aqueous 48% hydrobromic acid is utilized.

The parameters of temperature and pressure are not narrowly critical for the success of the present reaction. Thus, temperatures from about 0° to about 100° C. may be employed. However, in a preferred embodiment, a temperature of about room temperature is employed. The pressure may also vary from a pressure of about 1 atmosphere to about 50 atmospheres. In a preferred embodiment, atmospheric pressure (1 atmosphere) is employed.

Another aspect of the present invention is the preparation of novel desA-9β-steroids of the formula

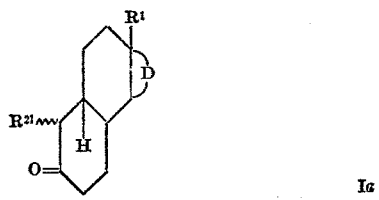

Ia wherein $R^1$ and D are as above and $R^{21}$ is 3-oxobutyl, ketalized 3-oxobutyl, 3-chlorobut-2-enyl, 2-alkoxycarbonylethyl or 2-carboxyethyl.

The preparation of the starting materials of formula II are generally known (see, for example, Belgian Patent nos. 667,025, 698,390, 741,826, 742,089 and 742,090 and copending U.S. Patent Application Serial No. 67,296). Additional preparation of the starting materials is detailed in the accompanying examples.

The desA-9β-steroids of formula I prepared according to the present invention are valuable intermediates for the preparation of pharmacologically active compounds, particularly, hormonally active steroids having the 9β,10α-configuration (retrosteroids). In particular, compounds of formula I where $R^2$ is hydrogen or an isoxazolyl-methyl group lead to 19-nor-retrosteroids, such as those of the formula

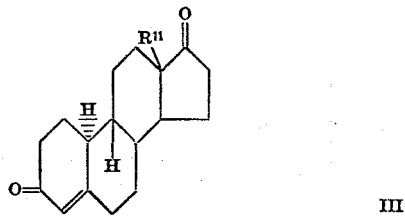

III where $R^{11}$ is a lower alkyl group of more than one carbon atom.

These 18-homo-19-nor-9β,10α-steroids are new compounds which are pharmacologically active. Thus, compounds of formula III are anabolic and androgenic agents with a favorable anabolic-androgenic ratio. They are also pituitary inhibitors, antiestrogenic agents and cholesterol lowering agents. Furthermore, compounds of formula III can be further converted to other pharmacologically active compounds.

The conversion of desA-9β-steroids of formula I where $R^2$ is lower alkyl or hydrogen to retrosteroids or 19-nor-retrosteroids is known (see, for example, Belgian Patent nos. 667,025, 697,157 and 741,826). For example, this conversion can be effected by addition of an α,β-unsaturated nitrile in the 10-position, hydrolysis, ring closure to the enollactone, treatment with an alkyl lithium or Grignard reagent, rearrangement and dehydration; or by addition of an alkyl vinyl ketone in the 10-position and intramolecular condensation to form the steroid A-ring.

Tetracyclic retrosteroids with the Diosgenin side chain obtained in this manner can be converted to retrosteroids having a 20-keto-pregnane side chain by the well known Marker degradation. These retropregnanes can easily be converted to the corresponding 17-keto-retroandrostanes.

The transformation of an isoxazolyl-methyl-desA-9β-steroid, for example, 19-(3,5-dimethyl-isoxazol-4-yl)-18-mthyl-desA-9β-androstan-5,17-dione into a pharmacologically useful end-product, for example, 18-methyl-19-nor-9β,10α-androst-4en-3,17-dione, can be accomplished by known methods, further details of which are presented in the accompanying examples.

In the examples which follow, all temperatures are expressed in degrees centigrade.

Example 1

A mixture of 1.310 g. racemic 19-(3,5-dimethyl-isoxazol-4-yl)-desA-androst-9-en-5,17-dione, 400 mg. 10% palladium on barium sulfate and 80 ml. ethanol was stirred for 15 minutes at room temperature. 2.0 ml. of 48% hydrobromic acid was added and the mixture was hydrogenated for 6 hours at room temperature and atmospheric pressure. The catalyst was filtered, the filtrate was diluted with benzene and was washed with saturated salt solution, saturated sodium bicarbonate solution and, finally, with salt solution, and was dried over anhydrous sodium sulfate. Removal of the solvent afforded 1.35 g. of crude racemic 19-(3,5-dimethyl-isoxazol - 4 - yl)-desA-9β-androstan-5,17-dione, m.p. 175–177.5° (dichloromethane/ether).

The starting material for this reaction was prepared as follows: a mixture of 320 ml. acetoacetic ester, 209 ml. pyrrolidine and 600 ml. benzene was heated for two hours at reflux with azeotropic removal of water. The benzene was removed under reduced pressure and the residue was distilled through a 10 cm. Vigreaux column to afford 427 g. β-pyrrolidino-crotonic acid ethyl ester as a bright yellow liquid, b.p. 155–156°/10 mm.

A mixture of 427 g. β-pyrrolidino-crotonic acid ethyl ester, 190 ml. nitroethane and 1300 ml. triethylamine in 1200 ml. dry chloroform was cooled in an ice-bath under nitrogen atmosphere and treated with a solution of 235 ml. phosphorus oxychloride in 400 ml. chloroform in such a manner that the temperature did not rise above 15°. During the addition, which took place over a three-hour period, a viscous orange precipitate formed. The mixture was stirred overnight under nitrogen, most of the solvent was removed under reduced pressure and the remaining paste was diluted with water and extracted with ether. The ether solution was washed with water, 3N hydrochloric acid, 5% sodium hydroxide solution and water and was dried over anhydrous sodium sulfate. After removal of the solvent under reduced pressure and distillation through a short Vigreaux column, there was obtained 4 - carbethoxy - 3,5-dimethyl-isoxazole as a colorless liquid, b.p. 100°/11 mm.

A solution of 272 g. 4-carbethoxy-3,5-dimethyl-isoxazole in 400 ml. of dry ether was added, under nitrogen stirring and with mild refluxing, to a suspension of 100 g. lithium aluminum hydride in 2.5 l. dry ether. The suspension was stirred at room temperature and under nitrogen overnight, and then was cooled in an ice-bath and was hydrolyzed with aqueous saturated sodium sulfate solution. The ethereal solution was dried over anhydrous sodium sulfate. Work-up afforded 3,5-dimethyl-4-hydroxy-methyl-isoxazole as white prisms, m.p. 76.5–77.5°.

A solution of 36.3 ml. of thionyl chloride and 50 ml. methylene chloride was cooled in an ice-bath and placed under a slightly reduced pressure. To this was added a solution of 40.0 g. 3,5-dimethyl-4-hydroxymethyl-isoxazole in 75 ml. methylene chloride over two and one-half hours and the mixture was then stirred for two hours at room temperature. Removal of the solvent under reduced pressure and distillation afforded 4-chloromethyl-3,5-dimethyl-isoxazole as a bright yellow liquid, b.p. 91.5–93°/15 mm.

A solution of 59.6 g. 4-chloromethyl-3,5-dimethyl-isoxazole and 116 g. triphenylphosphine in 1 l. of toluene was heated at reflux under a nitrogen atmosphere for six hours, and the resulting suspension was cooled, filtered and the filtrate was heated at reflux for 20 hours and the precipitate again filtered. The combined precipitates were washed well with ether and benzene, the filtrate was concentrated and the residue was taken up in 150 ml. toluene and heated under reflux for 18 hours. After filtration, the combined residues were recrystallized from ethanol-ether to afford (3,5-dimethyl-isoxazol-4-yl-methyl)-triphenylphosphonium chloride, m.p. 313–316°.

8.75 g. of a 55% sodium hydride dispersion was washed with pentane under nitrogen. After the addition of 600 ml. dry dimethyl sulfoxide, the mixture was carefully degassed, placed under nitrogen and heated for one hour at 70–75°. The gray-green solution was cooled to about 15° and 91.6 g. (3,5-dimethyl-isoxazol-4-yl-methyl)-triphenylphosphonium chloride was added all at once. After about five minutes, an orange precipitate formed in the deep red solution. The suspension was stirred for about 45 minutes at room temperature and then 25.0 g. of dimeric acrolein (freshly distilled from hydroquinone) was added dropwise so that the temperature did not go above 30°. The mixture was stirred for 20 minutes at room temperature and then three hours at 60–65°. The mixture was cooled, poured onto ice, filtered and the precipitate was washed with pentane. The filtrate was extracted with pentane, the pentane solution was washed with water and salt solution and dried over anhydrous sodium sulfate. Removal of the solvent and distillation from potassium carbonate afforded racemic 3,5-dimethyl-4-[2-(3,4-dihydro-2H-pyran-2-yl) - vinyl] - isoxazole, b.p. 83–85°/0.1 mm.

A mixture of 33.5 g. racemic 3,5-dimethyl-4-[2-(3,4-dihydro-2H-pyran-2-yl)-vinyl]-isoxazole in 400 ml. of dioxane and 400 ml. 1N sulfuric acid was stirred for one hour at room temperature and poured into 2 l. saturated aqueous sodium bicarbonate solution. After extraction with ether, the ether extract was washed with salt solution and dried over anhydrous sodium sulfate. The ether was removed, the residue was taken up in 2 l. of benzene, placed under nitrogen and after the addition of 400 g. manganese dioxide was stirred for 40 hours at room temperature. After filtration, the filtrate was concentrated and was crystallized twice from benzene-ether to afford racemic 7-(3,5-dimethyl-isoxazol-4-yl)-5-hydroxy-$\Delta^6$-heptenoic acid lactone, m.p. 90.0–91.5°.

16.8 g. of racemic 7-(3,5-dimethyl-isoxazol-4-yl)-5-hydroxy-$\Delta^6$-heptenoic acid lactone in 400 ml. ethyl acetate was hydrogenated in the presence of 500 mg. 10% palladium on carbon catalyst at room temperature at atmospheric pressure. After two hours, the hydrogenation was terminated, the catalyst was filtered and the solvent was evaporated. The residue was recrystallized from ether at −20° to afford 7-(3,5-dimethyl-isoxazol-4-yl)-5-hydroxy-enanthic acid lactone, m.p. 61–62.5°.

A solution of 10 g. racemic 7-(3,5-dimethyl-isoxazol-4-yl)-5-hydroxy-enanthic acid lactone in 150 ml. freshly distilled tetrahydrofuran was placed under nitrogen and cooled in a Dry Ice-isopropanol bath. To this was added 25 ml. of a 25% solution of vinylmagnesium chloride in tetrahydrofuran in such a manner so that the temperature did not rise above −60°. The mixture was stirred at −70° for 15 minutes and then carefully hydrolyzed with 5 ml. of methanol. It was then poured into a mixture of ice, 24 g. ammonium chloride and 8 ml. acetic acid and the solution was extracted with ether. The ether extract was washed with water, saturated aqueous sodium bicarbonate solution, saturated salt solution, dried over anhydrous sodium sulfate and treated with 10 ml. of diethylamine. After removal of the solvent, the crude racemic 2 - (2 - diethylaminoethyl)-6-[2-(3,5-dimethyl-isoxazol-4-yl)-ethyl]tetrahydropyran-2-ol was purified as its hydrochloride.

A solution of the amine thus obtained in 50 ml. of toluene was added to a solution of 5.3 g. 2-methyl-cyclopentan-1,3-dione in 150 ml. toluene and 50 ml. acetic acid which had previously been degassed and heated for five minutes under nitrogen atmosphere at reflux. After two hours heating at reflux, the solution was washed with water, saturated aqueous sodium bicarbonate and saturated salt solution and dried over anhydrous sodium sulfate. After removal of the solvent, the residue was chromatographed on 150 g. neutral alumina (Woelm activity III) using benzene as an elution medium. Recrystallization from ether-hexane and finally from ether at −20° afforded analytically pure racemic 3-[2-(3,5-dimethyl - isoxazol - 4 - yl) - ethyl]-6a$\beta$-methyl-1,2,3,5,6,6a-hexahydrocyclopenta[f][1]benzopyran - 7(8H) - one as bright yellow prisms, m.p. 113–116°.

12 g. of racemic 3-[2-(3,5-dimethyl-isoxazol-4-yl)-ethyl]-6a$\beta$-methyl - 1,2,3,5,6,6a - hexahydro cyclopenta[f][1]benzopyran-7(8H)-one in 50 ml. tetrahydrofuran was added to a suspension of 1.6 g. of lithium aluminum hydride and 150 ml. freshly distilled tetrahydrofuran which was cooled in ice and kept under a nitrogen atmosphere. The mixture was stirred for ten minutes at 0° and then one-half hour at room temperature, cooled in an ice-bath and hydrolyzed with aqueous saturated sodium sulfate solution and dried over anhydrous sodium sulfate. After filtration, the filtrate was evaporated to dryness. There was obtained by recrystallization from ether-tetrahydrofuran and from tetrahydrofuran analytically pure racemic 3-[2-(3,5-dimethyl-isoxazol - 4 - yl)-ethyl] - 7$\beta$ - hydroxy-6a$\beta$-methyl - 1,2,3,5,6,6a,7,8 - octahydrocyclopenta[f][1]benzopyran, m.p. 158.5–165°.

The crude racemic 3-[2-(3,5-dimethyl-isoxazol-4-yl)-ethyl]7$\beta$-hydroxy-6a$\beta$ - methyl - 1,2,3,5,6,6a,7,8 - octahydro-cyclopenta[f][1]benzopyran was dissolved in 350 ml. freshly distilled tetrahydrofuran and hydrogenated in the presence of 700 mg. 5% palladium on charcoal at room temperature and atmospheric pressure. One equivalent of hydrogen was taken up within four hours. The catalyst was filtered, washed with fresh tetrahydrofuran and from the filtrate was isolated by removal of the solvent racemic trans-3-[2-(3,5-dimethyl-isoxazol - 4 - yl)-ethyl] - 7$\beta$ - hydroxy-6a-methyl - 1,2,3,5,6,6a,7,8,9,9a - decahydro-cyclopenta[f][1]benzopyran as a bright green resin.

A solution of trans-3-[2-(3,5-dimethyl-isoxazol-4-yl)-ethyl] - 7$\beta$ - hydroxy - 6a - methyl - 1,2,3,5,6,6a,7,8,9,9a-decahydro-cyclopenta[f][1]benzopyran in 250 ml. acetone was stirred at room temperature for one and one-half hour with 125 ml. 1N sulfuric acid, poured into an excess of saturated aqueous sodium bicarbonate solution and extracted with chloroform. The chloroform extract was washed with salt solution and dried over anhydrous sodium sulfate. Removal of the solvent afforded racemic trans-3-[2-(3,5 - dimethyl-isoxazol - 4 - yl)-ethyl]-4a,7$\beta$-dihydroxy - 6a - methyl-per-hydro-cyclopenta[f][1]benzopyran as a yellow resin.

A solution of trans-3-[2-(3,5-dimethyl-isoxazol-4-yl)-ethyl]-4a,7$\beta$-dihydroxy - 6a - methyl-perhydro-cyclopenta-[f][1]benzopyran in 400 ml. acetone was cooled in an ice-bath and treated dropwise with a solution of 20 g. chromium trioxide in 100 ml. 6N sulfuric acid over a period of one-half hour. The mixture was stirred at room temperature for one and one-half hour, diluted with water and extracted with benzene. The benzene extract was washed with water, saturated aqueous sodium bicarbonate solution and saturated salt solution and dried over anhydrous sodium sulfate. There was obtained after removal of the solvent racemic trans-1a-methyl - 4 - [3-oxo-5-(3,5-dimethyl-isoxazol - 4 - yl)-pentyl]-perhydro-indan - 1,5-dione as a yellow resin.

The crude trans-1a1methyl - 4 - [3-oxo-5-(3,5-dimethyl-isoxazol-4-yl)-pentyl]perhydro-indan - 1,5 - dione was dissolved in 100 ml. methanol, degassed and placed under nitrogen. After addition of 1 g. potassium hydroxide, the solution was heated under reflux for one and one-half hour in a nitrogen atmosphere, cooled, diluted with water and extracted with benzene. The benzene extract was washed with water and saturated salt solution and dried over anhydrous sodium sulfate. After removal of the solvent, the residue was chromatographed on 150 g. neutral alumina (Woelm activity I) with benzene ether (3:1). From the eluate there was obtained after crystallization from benzene-hexane analytically pure trans-anti-6-[(3,5-dimethyl-isoxazol-4-yl)-methyl] - 3a - methyl - 3,7 - dioxo-1,2,3a,4,5,7,8,9,9a,9b-decahydro - 3H - benz[e]indene, m.p. 141–143.5°, alternatively named as 19-(3,5-dimethyl-isoxazol-4-yl)-desA-androst-9-en-5,17-dione.

Example 2

In a manner analogous to that in Example 1, a mixture of 4.911 g. optically active 19-(3,5-dimethyl-isoxazol-4-yl)-desA-androst-9-en-5,17-dione, 1.5 g. 10% palladium on barium sulfate and 7.5 ml. 48% hydrobromic acid was hydrogenated in 600 ml. ethanol for six and one-half hours. After work-up as in Example 1 and chromatography, there was obtained 4.75 g. crude optically active 19-(3,5-dimethyl-isoxazol-4-yl)-desA - 9β-androstan-5,17-dione. Recrystallization from dichloromethane-ether and work-up of the filtrate afforded the desired end-product in 66% yield, m.p. 170–174.5°.

Example 3

In a manner analogous to that in Example 1, a mixture of 1.032 g. racemic 19-(3,5-dimethyl-isoxazol-4-yl)-18-methyl-desA-androst-9-en-5,17-dione, 300 mg. 10% palladium on barium sulfate and 1.5 ml. 48% hydrobromic acid was hydrogenated for six and one-half hours in 60 ml. ethanol. The catalyst was filtered, the filtrate was worked up as in Example 1 and after two recrystallizations from dichloromethane-ether racemic 19-(3,5-dimethyl-isoxazol-4-yl) - 18 - methyl-desA - 9β - androstan-5,17-dione, m.p. 174.5–176° was obtained in 72% yield.

Example 4

A mixture of 500 mg. 17β-hydroxy-19-methyl-desA-androst-9-en-5-one, 200 mg. 10% palladium on barium sulfate and 40 ml. ethanol was stirred for 15 minutes at room temperature. One ml. of 48% hydrobromic acid was added and the mixture was hydrogenated at atmospheric pressure until the reaction product showed no more UV adsorption (approximately 18 hours; hydrogen uptake 1.1 equivalents). The catalyst was filtered and the acidic filtrate was evaporated to dryness. Ether and water were added and the ether layer was washed twice with aqueous sodium bicarbonate solution and twice with salt solution, and dried over sodium sulfate and evaporated. The crude product (500 mg.) was chromatographed on a 200-fold amount of silica gel with cyclohexaneethyl acetate (3:1). There were first isolated 80 mg. hydrogenolysis product, then about 100 mg. 17β-hydroxy-19-methyl-desA-9α,10α-androstan-5-one, m.p. 69–70° (ether-hexane), $$[\alpha]_{589}^{25} = -5°$$

(c.=0.1 in dioxane) and finally about 300 mg. 17β-hydroxy-19-methyl-desA-9β,10β-androstan-5-one, m.p. 86–87° (ether-hexane)

$$[\alpha]_{589}^{25} = +2°$$

(c.=0.1 in dioxane).

Example 5

A mixture of 500 mg. 17β-acetoxy-19-methyl-desA-androst-9-en-5-one, 92 mg. 10% palladium on barium sulfate and 20 ml. ethanol was stirred for 15 minutes at room temperature. Ten ml. of 48% hydrobromic acid was added and the mixture was hydrogenated for two and one-half hours at atmospheric pressure (hydrogen uptake 1.1 equivalents). The catalyst was filtered and the filtrate was concentrated to a volume of about 10 ml. Ten ml. of a 10% methanolic potassium hydroxide solution was added under an argon atmosphere. The mixture was heated for two hours at reflux, the cooled solution was concentrated, treated with water and extracted with methylene chloride. The extract was washed twice with water, dried over sodium sulfate and the solvent was removed. There was obtained 420 mg. of a crystalline crude product consisting of 14% hydrogenolysis product, 7% 17β-hydroxy-19-methyl-desA - 9α,10α - androstan - 5 - one and 79% 17β-hydroxy-19-methyl-desA-9β,10β-androstan-5-one (isomer ratio 9β:9α=92.8). After chromatography on silica gel with cyclohexane-ethyl acetate (3:1) and crystallization from ether-hexane there was obtained 290 mg. (67%) pure 17β-hydroxy-19-methyl-desA-9β,10β-androstan-5-one.

Example 6

A solution of 110.55 g. of 17β-acetoxy-desA-androst-9-en-5-one in 1.6 l. methanol was treated with 42.56 g. 5% palladium on barium sulfate and shaken. After 15 minutes, 50.48 g. of 48% hydrobromic acid was added. This mixture was hydrogenated at room temperature and atmospheric pressure until no more hydrogen was taken up. The filtered reaction solution was treated with 400 ml. 25% aqueous hydrochloric acid and heated at reflux for three hours. After concentration in vacuum to about 500 ml., 8 l. ether and 2 l. water were added. The ether layer afforded 93.7 g. crude 17β-hydroxy-desA-9β-androstan-5-one (yield 99.1%). In order to remove the non-polar hydrogenolysis product and most of the 9α-isomer, the crude product was heated with 600 ml. absolute hexane for 30 minutes at reflux. After filtration and concentration to dryness, there was obtained 89.3 g. pure 17β-hydroxy-desA-9β-androstan - 5 - one (purity 99.6%, yield 94.6%) which by recrystallization from benzene gave a purity of greater than 99.9% (yield 83.6%), m.p. 144–145.5°.

Example 7

A mixture of 15.20 g. 20β-acetoxy-desA-pregn-9-en-5-one, 3.80 g. 7% palladium on barium sulfate and 200 ml. methanol was stirred for 15 minutes, treated with 338 mg. 48% hydrobromic acid in 20 ml. of methanol and hydrogenated at room temperature and atmospheric pressure for 20 hours. The filtered reaction solution was taken to dryness and the residue was taken up in ether and the ether solution was washed with water and evaporated. After azeotropic drying with ethanol and benzene, there was obtained 15.3 g. crude 20β-acetoxy-desA-9β-pregnan-5-one (yield 100%), which by further treatment with n-hexane could be brought to a purity of about 99.8%, m.p. 99–100° (yield 83%).

Example 8

In an analogous fashion to Example 7, a mixture of 13.12 g. 20β-hydroxy-desA - pregn-9-en-5-one, 5.32 g. 5% palladium on barium sulfate and 150 ml. methanol was hydrogenated after treatment with 16.9 g. of 48% hydrobromic acid and the reaction product was worked up as described in Example 7. 20β-Hydroxy-desA-9β-pregnan-5-one was obtained in almost theoretical yield. This was dissolved in 40 ml. pyridine and treated for 20 hours with 13 ml. acetic anhydride. The reaction mixture was poured onto ice and extracted with ether and the extract was washed with 10% hydrochloric acid, saturated sodium bicarbonate solution and water and was then evaporated to dryness. The residue was azeotropically dried by treatment with 50 ml. ethanol and 50 ml. benzene as above.

15.35 g. crude 20β-acetoxy-desA-9β-pregnan-5-one was obtained in almost 100% yield. Recrystallization from n-hexane brought this sample to 99.8% purity (yield 91.9%), m.p. 98.5–100°.

Example 9

A solution of 3.58 g. desA-22β-spirost-9-en-5-one in 60 ml. methanol was treated with 1.07 g. of a 5% palladium on barium sulfate catalyst. After the addition of 3.4 g. 48% hydrobromic acid, the reaction mixture was hydrogenated at room temperature for 18 hours. After workup of the reaction product in the usual manner and crystallization from n-hexane, there was obtained desA-9β,22β-spirostan-5-one, m.p. 119–120°, yield 85% (purity >99.9%).

Example 10

A mixture of 6.83 g. 19-(3,5-dimethyl-isoxazol-4-yl)-18-methyl-desA - 9β - androstan-5,17-dione prepared in a manner analogous with that described in Example 1, 1.5 g. p-toluenesulfonic acid, 25 ml. ethylene glycol and 250 ml. benzene was degassed and heated at reflux under a nitrogen atmosphere for 22 hours with azeotropic removal of the water of reaction. The reaction mixture was cooled and washed with saturated aqueous sodium bicarbonate solution, water and salt solution and dried over sodium sulfate. After removal of the solvent, there was obtained a white crystalline powder which was suspended in 200 ml. 42% ethanolic sodium hydroxide and hydrogenated in the presence of 1.0 g. 5% palladium on charcoal at room temperature and atmospheric pressure. After 10 hours, the catalyst was filtered and the filtrate was concentrated to about 100 ml. and treated with 200 ml. of 20% aqueous sodium hydroxide solution, degassed and heated at reflux under a nitrogen atmosphere for ten hours. The mixture was cooled, poured into water and extracted with benzene. The benzene solutions were washed with sodium chloride solution and dried over anhydrous sodium sulfate. Removal of the solvent afforded a yellow resin which was dissolved in 200 ml. of methanol. The solution was treated with 20 ml. of 3N hydrochloric acid, degassed and heated to reflux for four hours under a nitrogen atmosphere. After cooling, it was poured into water and extracted with benzene. The extracts were washed with salt solution, sodium bicarbonate solution and again with salt solution. After drying over sodium sulfate and removal of the solvent, there was obtained crude 18-methyl-19-nor-9β,10α-androst-4-en-3,17-dione which, after purification by chromatography and recrystallization from acetone, had a melting point of 203–208° C.

Example 11

A mixture of 4.0 g. 17β-hydroxy-19-nor-desA-androst-9-en-5-one, 736 mg. 10% palladium on barium sulfate and 160 ml. of ethanol was stirred for 15 minutes at room temperature. After the addition of 0.08 ml. of 48% hydrobromic acid, the mixture was hydrogenated for 40 minutes at atmospheric pressure. The catalyst was filtered, the filtrate was treated with 20 ml. of water and taken to dryness under reduced pressure. The residue was taken up in ether and washed with saturated sodium bicarbonate solution and water. After drying over sodium sulfate, the ether solution was concentrated. The crude product which consisted of 85.7% 17β-hydroxy-19-nor-desA-9β-androstan-5-one and 14.3% 17β-hydroxy-19-nor-desA-androstan-5-one afforded, after one crystallization from isopropyl ether, 2.5 g. (61% yield) of pure 17β-hydroxy-19-nor-desA-9β-androstan-5-one, m.p. 128–129° C.

Example 12

A mixture of 2 g. 17β-acetoxy-19-nor-desA-androst-9-en-5-one, 368 mg. 10% palladium on barium sulfate and 80 ml. ethanol was stirred for 15 minutes at room temperature. After the addition of 0.04 ml. 48% hydrobromic acid, the mixture was hydrogenated for one hour at atmospheric pressure. The catalyst was filtered, the filtrate was treated with 10 ml. of water and taken to dryness. The residue was taken up in ether, washed with saturated sodium bicarbonate solution and water, dried over sodium sulfate and taken to dryness. The crystalline crude product (2.0 g.) consisted of 0.7% hydrogenolysis product, 93.2% 17β-acetoxy-19-nor-desA-9β-androstan-5-one and 6.1% 17β-acetoxy-19-nor-desA-androstan-5-one. Recrystallization from hexane afforded 1.48 g. (73% yield) of pure 17β-acetoxy-19-nor-desA-9β-androstan-5-one, m.p. 127–128°.

Example 13

A mixture of 2 g. of 20β-acetoxy-19-nor-desA-pregn-9-en-5-one, 368 mg. 10% palladium on barium sulfate and 80 ml. ethanol was stirred at room temperature for 15 minutes. After addition of 0.04 ml. 48% hydrobromic acid, the mixture was hydrogenated for 45 minutes at atmospheric pressure. The catalyst was filtered, the filtrate was treated with 10 ml. water and taken to dryness. The residue was dissolved in ether, washed with saturated sodium bicarbonate solution and water. After drying over sodium sulfate, the solvent was removed. The crude product (2.0 g.) consisted of 90.7% 20β-acetoxy-19-nor-desA-9β-pregnan-5-one and 9.3% 20β-acetoxy-19-nor-desA-pregnan-5-one. Two recrystallizations from ether-hexane afforded 0.87 g. (43% yield) 20β-acetoxy-19-nor-desA-9β-pregnan-5-one, m.p. 97.5–99°.

Example 14

A mixture of 1 g. 19-nor-desA-androst-9-en-5,17-dione, 184 mg. 10% palladium on barium sulfate and 40 ml. ethanol was stirred for 15 minutes at room temperature. After the addition of 0.02 ml. 48% hydrobromic acid, the mixture was hydrogenated at atmospheric pressure for 70 minutes. The catalyst was filtered, the filtrate was treated with 10 ml. water and taken almost to dryness. The residue was dissolved in ether, the solution was washed with saturated sodium bicarbonate solution and water, dried over sodium sulfate and evaporated to dryness. The crude product (929 mg.) which spontaneously crystallized contained 0.8% hydrogenolysis product, 88.5% 19-nor-desA-9β-androstan-5,17-dione and 10.7% 19-nor-desA-androstan-5,17-dione. Recrystallization from ether-isopropyl ether afforded 456 mg. (45% yield) of pure 19-nor-desA-9β-androstan-5,17-dione, m.p. 72–73°.

Example 15

A solution of 347.4 g. 5,5-ethylenedioxy-azeleonitrile in 1.5 l. acetone, cooled to 10°, was treated with 1 l. aqueous 3N hydrochloric acid at 10°. After 18 hours at room temperature, it was concentrated under reduced pressure at 40° to about 1.5 l. Extraction with methylene chloride (1× 600 ml., 3× 300 ml.), washing the extract with saturated salt solution (2× 200 ml.), drying and concentration under reduced pressure afforded 276 g. 5-oxoazeleonitrile, which after distillation at 137–140°/0.05 mm. was a colorless liquid.

A solution of 276 g. crude 5-oxoazeleonitrile in 500 ml. methanol and 500 ml. water was added with stirring to a solution of 33 g. sodium borohydride in 300 ml. water cooled to 5°, during which time the temperature remained between 5 and 10°. The mixture was stirred 90 minutes at room temperature, and taken to a pH of 2–3 by treatment with aqueous 4N sulfuric acid with cooling and extracted with methylene chloride (1× 500 ml., 2× 250 ml. and 2× 125 ml.). The combined extracts were washed with 200 ml. salt solution, dried and concentrated under reduced pressure to afford 272 g. 5-hydroxyazeleonitrile as a colorless liquid.

A soluion of 272 g. crude 5-hydroxyazeleonitrile in 1.5 l. toluene was treated with 312 g. p-toluenesulfonic acid monohydrate and heated at reflux for one hour with stirring. After cooling, the precipitate was filtered. The filtrate was washed with water (3× 100 ml.), dried, concentrated under reduced pressure to afford after distillation 214 g. pure 8-cyano-5-hydroxyoctanoic acid lactone, b.p. 162–165°/0.2 mm.

A solution of 8.35 g. of thee above-obtained 8-cyano-5-hydroxy-octanoic acid lactone in 40 ml. dry tetrahydrofuran (THF) cooled to —70° was treated with 38 ml. of a 2-molar solution of vinyl magnesium chloride in THF over a period of 14 minutes. The mixture was stirred for six minutes at —50°, cooled to —65°, treated with 2 ml. of methanol, and after the removal of the cooling bath, was treated with 50 ml. of 5% aqueous ammonium chloride solution. After the addition of acetic acid (pH still alkaline) the mixture separated into two phases. The aqueous phase was extracted with THF (1× 100 ml. and 2× 50 ml.). Ten ml. of diethylamine was added to the combined THF extract. The mixture was allowed to stand at room temperature for two hours and concentrated under reduced pressure. There was thus obtained 17 g. of an oil which, after purification in the usual manner, afforded 10.84 g. pure 6-(3-cyanopropyl)-2-(2-diethylaminoethyl)-tetrahydropyran-2-ol.

A mixture of 18.92 g. of the above-obtained 6-(3-cyanopropyl) - 2 - (2 - diethylaminoethyl) - tetrahydropyran-2-ol, 8.72 g. 2-methyl-1,3-cyclopentane dione, 64 ml. acetic acid and 253 ml. toluene was heated to reflux for one and one-half hours with stirring. After cooling, the mixture was washed with water (2× 100 ml.), 0.5N hydrochloric acid (1× 100 ml.) and saturated aqueous sodium bicarbonate solution (2× 100 ml.), dried and concentrated under reduced pressure. After repeated recrystallization of the residue, there was obtained pure 3-(3 - cyanopropyl) - 6a - methyl-1,2,3,5,6,6a-hexahydrocyclopenta[f][1]benzopyran - 6(8H) - one as bright yellow crystals, m.p. 100–101.5°.

A solution of 6 g. 3-(3-cyanopropyl)-6a-methyl-1,2,3, 5,6,6a - hexahydrocyclopenta[f][1]benzopyran - 7(8H)- one in 35 ml. benzene was added dropwise over ten minutes to an ice-cold solution of 0.864 g. sodium borohydride in 50 ml. ethanol and 5 ml. water. The mixture was stirred for 25 minutes in an ice-bath and 15 minutes at room temperature and then poured into aqueous salt solution. After work-up of the organic phase, there was obtained 6 g. 3-(3 - cyanopropyl)-6a-methyl-1,2,3,5,6,6a, 7,8 - octahydrocyclopenta[f][1]benzopyran-7β-ol, which was dissolved in 35 ml. of toluene and 25 ml. THF and hydrogenated in the presence of 1 g. 5% palladium on charcoal catalyst for 23 hours at room temperature and atmospheric pressure to afford 6.65 g. 6a,9a-*trans*-3-(3-cyanopropyl) -6a - methyl - 1,2,3,5,6,6a,7,8,9,9a-decahydrocyclopenta[f][1]benzopyran-7β-ol.

The hydrogenation product was dissolved in 165 ml. acetone and the solution was treated with 15 ml. 0.5N sulfuric acid. After stirring for three and one-half hours at room temperature, the mixture was cooled in an ice-bath and treated dropwise with 16.5 ml. Jones reagent. After removal of the ice-bath, the mixture was further stirred for three and one-quarter hours at room temperature, the excess oxidizing agent was destroyed with sodium bisulfite and the mixture was treated with salt solution and benzene. From the organic phase there was obtained, after the usual work-up, 5.93 g. 4-(6-cyano-3-oxohexyl)-7a-methyl-perhydroindan-1,5-dione as an oil.

A solution of 3.983 g. 4 - (6 - cyano - 3-oxohexyl)-7a-methyl-perhydroindan-1,5-dione in 20 ml. methanol was treated with 10 ml. of 0.1 M methanolic potassium hydroxide solution and heated for two hours at reflux with stirring. After cooling, the mixture was poured into salt solution. The mixture was extracted twice with acetone and once with methylene chloride, the extract dried and concentrated under reduced pressure. There was obtained 2.8 g. crude product which after recrystallization from ethanol afforded 1.5 g. pure *trans-anti*-6-(2-cyanoethyl)-3a - methyl - 3,7 - diketo-1,2,3a,4,5,7,8,9,9a,9b-decahydro-3H-benz[e]indene as bright yellow crystals, m.p. 105–107.

Hydrolysis of the above nitrile according to known methods affords the corresponding 6-(2-carboxyethyl)- compound, which in turn can be esterified according to known methods.

Example 16

To a solution of 408 mg. pure *trans-anti*-6-(2-cyanoethyl) - 3a - methyl-3,7-diketo-1,2,3a,4,5,7,8,9,9a,9b-decahydro - 3H - benz[e]indene in 25 ml. of ethanol was added 200 mg. of 10% palladium on barium sulfate catalyst and the resulting suspension was stirred at 25° for 15 minutes. To the flask was added 0.25 ml. (2.0 mmoles) of 48% hydrobromic acid and the resulting mixture was hydrogenated at atmospheric pressure and room temperature. The catalyst was removed by filtration and washed with fresh ethanol. The filtrates were diluted with benzene, washed with water, saturated aqueous sodium bicarbonate solution, and water, and dried over sodium sulfate, There was thus obtained a yellow resin which was chromatographed on 50 g. of silica gel with 8:2 benzene: ether to give an orange resin. Trituration of this material with isopropyl ether gave a white solid, m.p. 97–129°. Crystallization from methylene chloride-isopropyl ether gave white prisms of 19-(cyanomethyl)-desA-9β-androstan-5,17-dione, m.p. 133.5–135°.

*Analysis.*—Calcd. for $C_{17}H_{23}O_2N$: C, 74.69; H, 8.48; N, 5.12. Found: C, 74.58; H, 8.66; N, 5.05.

NMR, 0.98 p.p.m. (3H singlet, $CH_3$); IR 2244 cm.$^{-1}$ (—C≡N), 1734 cm.$^{-1}$ (C–17 C=O), 1705 cm.$^{-1}$ (C–5 C=O); MS m/e 273 (M$^+$); $[\alpha]_D^{25}$ +37.7° (C=1.30, $CHCl_3$).

What is claimed is:

1. A process for the preparation of a desA-9β-steroid of the formula

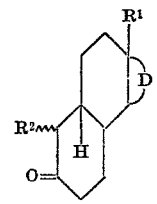

wherein $R^1$ is lower alkyl; $R^2$ is hydrogen, lower alkyl, 3-oxobutyl, ketalized 3-oxobutyl, 3-chlorobut-2-enyl, [2-lower alkoxycarbonylethyl], 2-carboxyethyl, 2-cyanoethyl or isoxazolyl-methyl of the formula

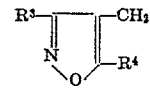

$R^3$ and $R^4$ are the same lower alkyl or one of these groups is hydrogen and the other lower alkyl; D is a group of the formula

or

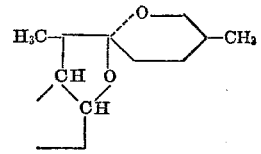

wherein Z is carbonyl or one of the groups

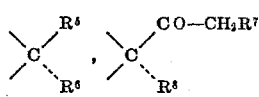

or

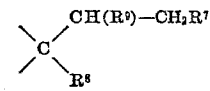

wherein $R^5$ is hydroxy, etherified or esterified hydroxy; $R^6$ is hydrogen or lower alkyl; $R^7$ is hydrogen or hydroxy; $R^8$ is hydrogen, hydroxy or lower alkyl and $R^9$ is hydroxy or esterified hydroxy, which comprises the step of hydrogenating a desA-$\Delta^9$-steroid of the formula

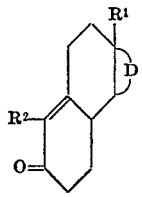

wherein $R^1$, $R^2$ and D are as above, in an alcohol solvent selected from the group consisting of methanol, ethanol, propanol and tert-butanol with palladium in the presence of hydrogen bromide at a temperature between about 0° and 100° C. and a pressure between about 1 and 50 atmospheres.

2. The process of claim 1 wherein Z is a carbonyl.

3. The process of claim 1 wherein $R^2$ is isoxazolyl methyl of the formula

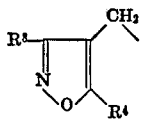

where $R^3$ and $R^4$ are as above.

4. The process of claim 3 wherein $R^2$ is a (3,5-dimethylisoxazol-4-yl)-methyl, i.e., where $R^3$ and $R^4$ are both methyl.

5. The process of claim 1 wherein $R^2$ is hydrogen.
6. The process of claim 1 wherein $R^2$ is methyl.
7. The process of claim 1 wherein $R^2$ is ethyl.
8. The process of claim 1 wherein $R^2$ is 3-oxobutyl.
9. The process of claim 1 wherein $R^2$ is 2-cyanoethyl.
10. The process of claim 1 wherein $R^2$ is 2-carboxyethyl.
11. The process of claim 1 wherein $R^2$ is 3-chlorobut-2-enyl.
12. The process of claim 1 wherein the alcohol is ethanol.
13. The process of claim 1 wherein the palladium catalyst is present on a support.
14. The process of claim 13 wherein the support is barium sulfate.
15. The process of claim 1 wherein the temperature is room temperature and the pressure is atmospheric pressure.
16. The process of claim 1 wherein the quantity of hydrogen bromide utilized is between 0.003 and 10 equivalents with respect to the desA-$\Delta^9$-steroid.
17. The process of claim 4 wherein the desA-9$\beta$-steroid produced is 19 - (3,5-dimethyl-isoxazol-4-yl)-18-methyl-desA-9$\beta$-androsta-5,17-dione, i.e., wherein R' is ethyl and D is a group of the formula

References Cited

UNITED STATES PATENTS 3,652,596  3/1972  Fried _____ 260—340.9
3,658,847  4/1972  Fried _____ 260—340.9

OTHER REFERENCES

Fieser et al., "Organic Chemistry," 2nd Edition (1950), Heath & Co., Boston, Mass., pp. 287–288.

RAYMOND V. RUSH, Primary Examiner

U.S. Cl. X.R.

260—345.1, 345.7, 345.8, 345.9, 397.3, 464, 468 B, 468 F, 514 R, 586 H